June 10, 1941. R. CHILTON 2,245,251
ARTICULATED PROPELLER
Filed Nov. 30, 1937 4 Sheets-Sheet 3

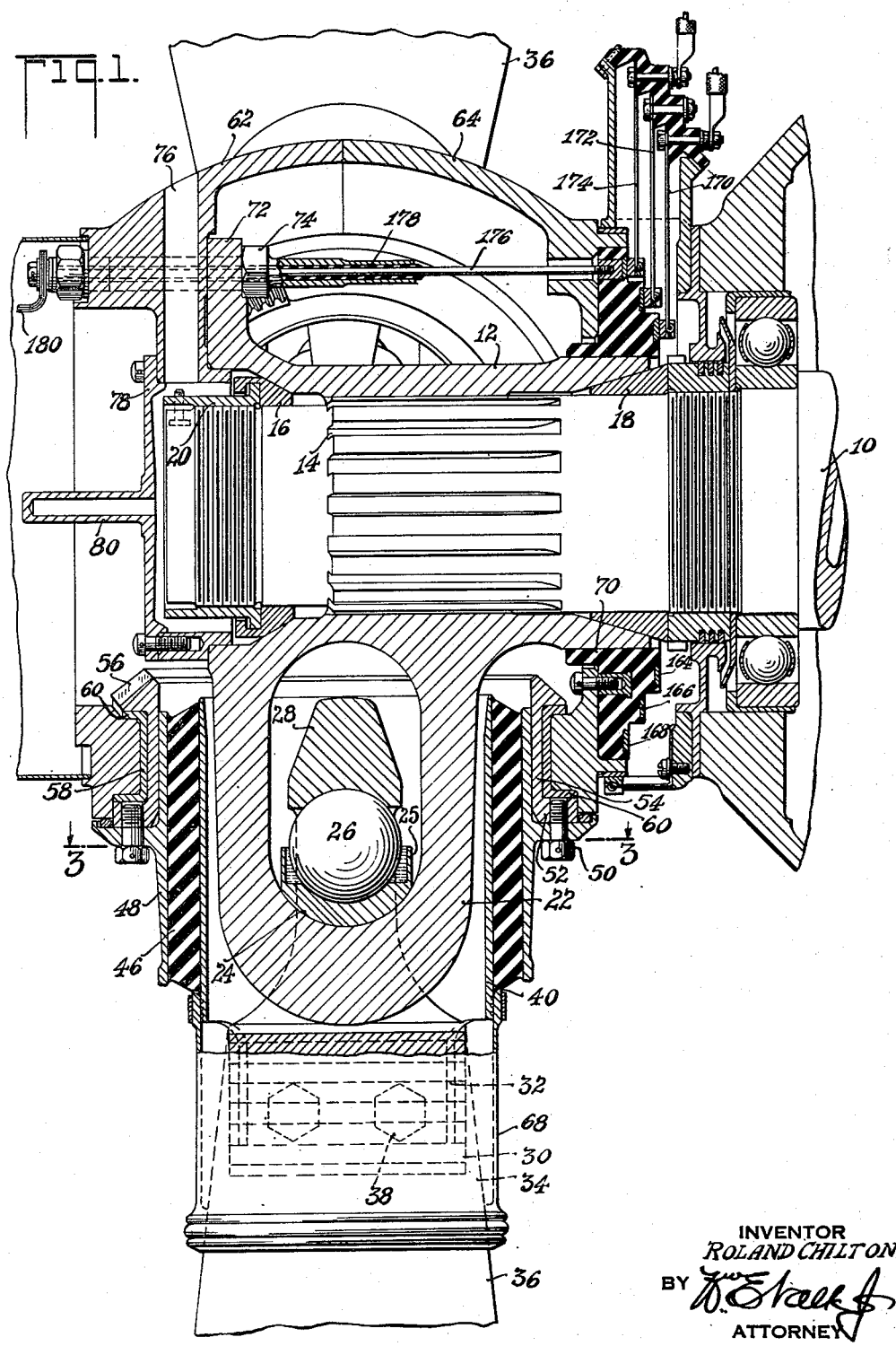

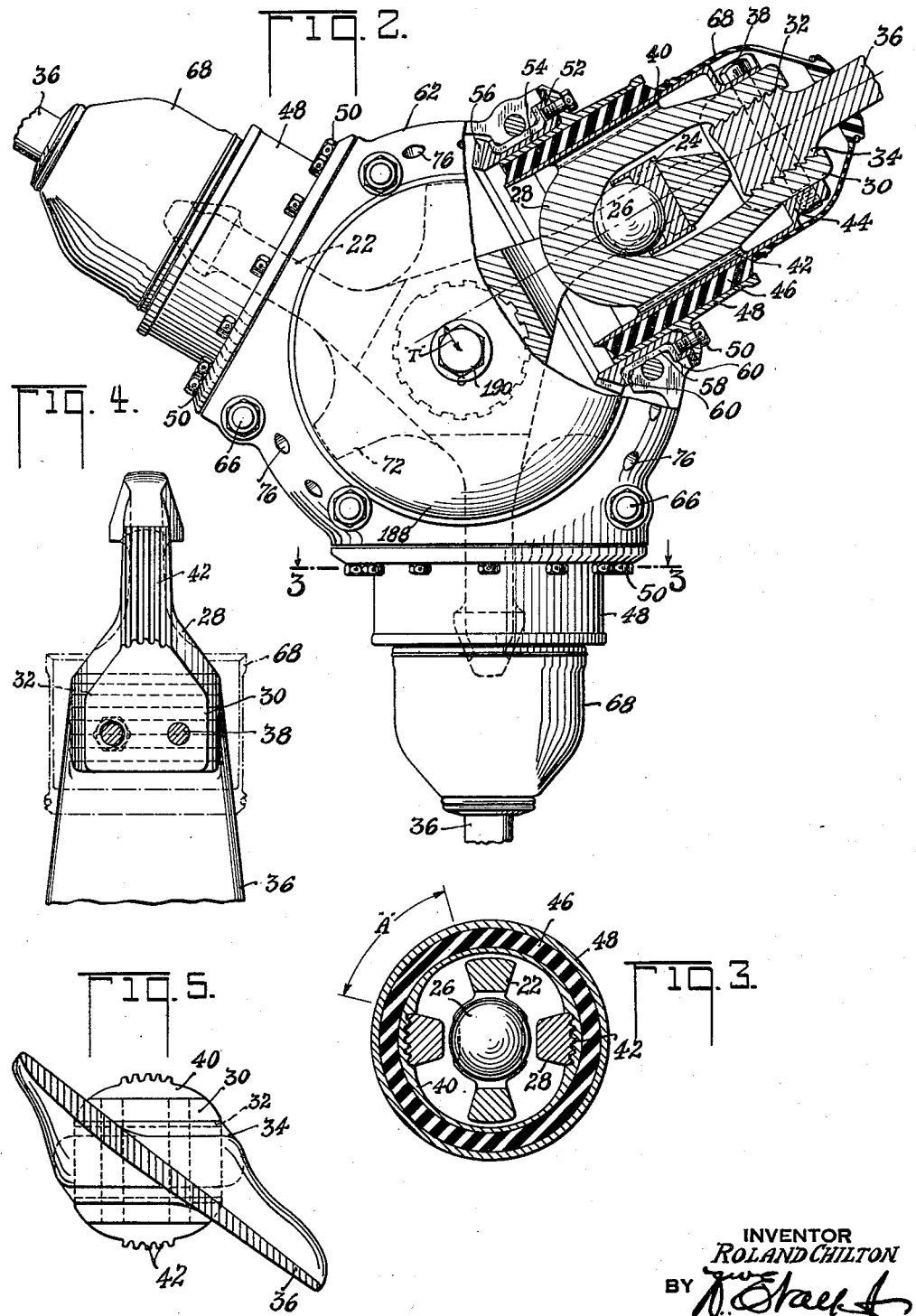

INVENTOR
ROLAND CHILTON
BY
ATTORNEY

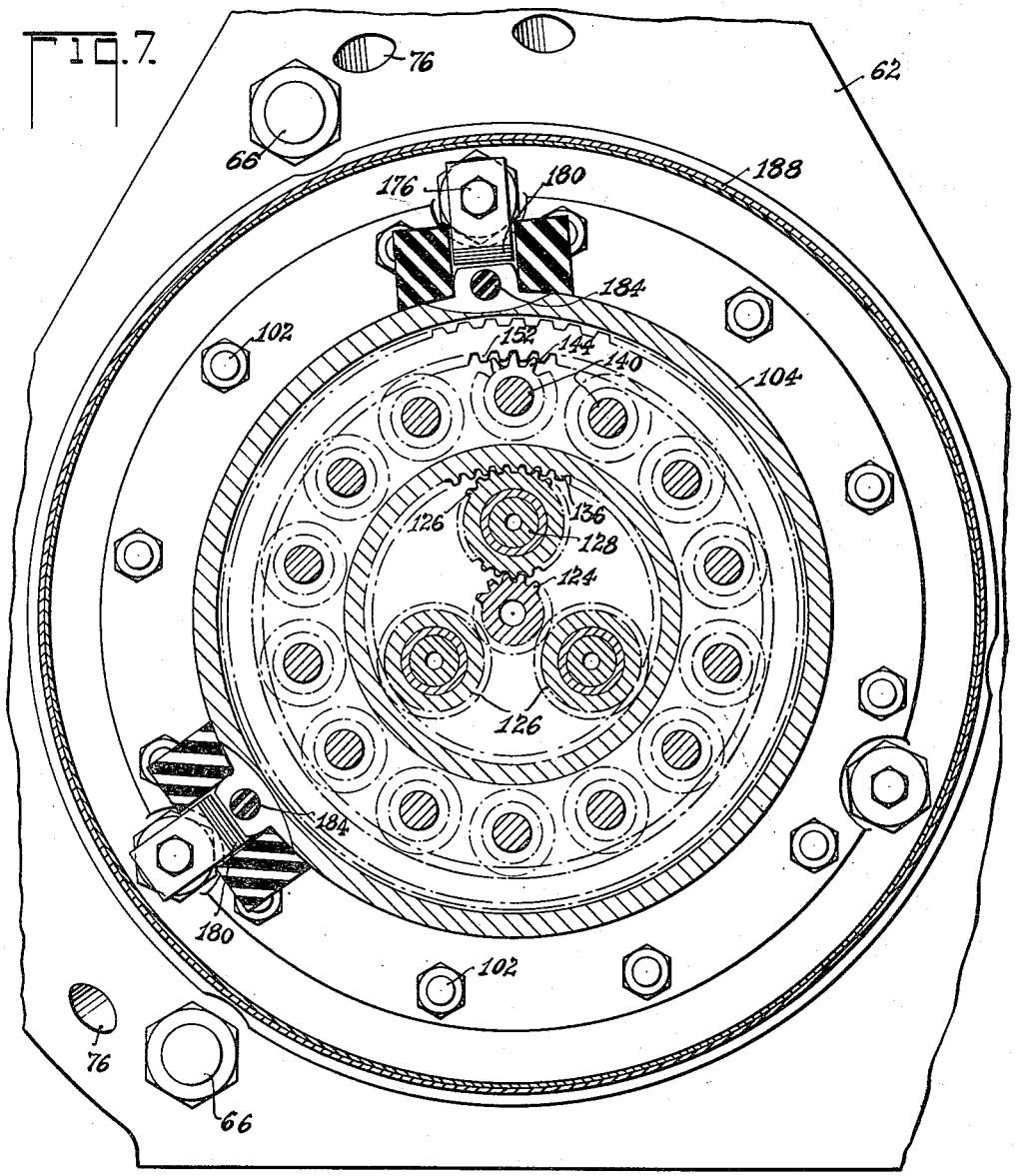

Patented June 10, 1941

2,245,251

UNITED STATES PATENT OFFICE 2,245,251

ARTICULATED PROPELLER

Roland Chilton, Ridgewood, N. J., assignor, by mesne assignments, to Wright Aeronautical Corporation, Paterson, N. J., a corporation of New York Application November 30, 1937, Serial No. 177,186

9 Claims. (Cl. 170—162)

This invention relates to articulated blade propellers in general, and particularly as applied to aircraft engine propellers requiring controllable pitch.

The objects and advantages of the invention are, in general, similar to those set forth in my co-pending application, Serial No. 172,559 filed November 3, 1937. The general nature of the problems which these inventions seek to solve may be recapitulated as follows:

An engine crankshaft and propeller combination comprises an elastic system incorporating two major rotating masses i. e., the propeller and the crank masses including the connecting rods; counter-weights and pistons. The elastic yield in the system includes the bending flexibility of the propeller blades themselves, and of their hub attachments, in addition to the torsional yield of the crankshaft itself, wherefore the resultant natural frequencies i. e., the torsional character- istics of the system, are modified by changes in the rigidity of any of these parts. In practice, difficulties with torsional vibration may be induced in an engine which was previously satisfactory by apparently slight changes in stiffness between one type of propeller and another.

In radial engines having conventional articulated and master rods the orders of vibration exciting forces and their harmonics include all numbers from ½ by ½ increments up to the number of cylinders. As the engine must operate over a wide speed range, and as the crankshaft and propeller system may have more than one character and frequency of vibration response, conventional constructions exhibit synchronism at more than one speed; and the number of different orders of resonant vibration encountered in practice increases with the number of crank throws.

The main exciting force is at explosion frequency and has been effectively neutralized by means of dynamic dampers which have gone into wide use in accordance with my Patent No. 2,112,984 issued April 5, 1938. However, where resonance to several orders of harmonics is encountered, as in two-bank radial engines, installation of the corresponding multiplicity of dampers becomes complicated, especially as a change to a propeller having slightly different stiffness in its blades and/or blade mounting, may introduce response to a frequency not previously in evidence.

It can be shown mathematically that if the torsional stiffness of the crankshaft propeller system could be reduced to be of the order of $\frac{1}{25}$ of that occurring with present proportions, torsional response to the first, and all higher, orders would be eliminated. Incorporation of a conventional "spring drive" of this extreme flexibility, to transmit current horsepower outputs, would involve bulky and heavy mechanism, and accordingly, a prime object of the present invention is to oppose components derived from the necessarily great centrifugal force of the propeller blades to balance the torque to be transmitted, whereby the desired extreme torsional flexibility is achieved without the great weight and bulk necessary where spriing means are used.

This is achieved by means of an articulated propeller blade mounting wherein the blade is hinged on a virtual arm extending rigidly from the propeller hub so that the blade is free to lag in the plane of rotation until the tangential component of centrifugal force thereby generated balances the torque input, and the system is in equilibrium.

The history of the development of metal propellers to satisfactory avoidance of fatigue failure has included repeated increasing of the sections to bring the natural frequency of the system above synchronism with any of the various exciting forces and their harmonics, the current sections being many times the proportions that can be justified on the basis of the mere centrifugal and torque loads to be transmitted, in the absence of resonant vibration. This great increase in blade weight has correspondingly increased the centrifugal force and hence the dimensions required for the propeller hub and the blade mounting means therein. In spite of this enormous excess of present proportions over that necessary for mere transmission of the engine power and the aero-dynamic forces involved, the propeller and/or crankshafts still fail if substantial resonance is encountered. In other words, the strengthening is not successful because it permits the parts to withstand resonant vibration but only if and when it bring the natural frequencies to be above that of the various orders of exciting forces. A propeller that has been stiffened until it is just outside of this range on one engine may develop resonance when the maximum engine speed is increased, or when transferred to another engine, so that separate endurance tests must be run on every engine and propeller type combination, even in the same horsepower class.

In operation, under non-vibratory conditions, the aggregate bending moments at the roots of the propeller blade are, of course, merely equal to the horsepower torque transmitted to the propeller by the engine shaft, and the required blade root and mounting strength for these forces is a mere fraction of that to which current practice has been forced in the effort to avoid resonance by increased stiffness.

The present invention approaches the problem from the other extreme, by bringing the "stiffness" at the propeller blade root to a very low value, by an articulated connection stabilized by centrifugal force and the invention includes new and improved mechanism for such articulated mounting. This may be utilized with fixed pitch propellers, but as controllable pitch propellers are used in all large modern aircraft, the invention includes a novel articulation on which the blade is free for rotation in pitch and to yield to both torque and thrust forces.

Other objects and advantages will be obvious and will be pointed out in the following description with reference to the drawings in which:

Fig. 1 is an axial section through a propeller hub and blade mounting according to the invention;

Fig. 2 is an end view including a fragmentary section through the axis of one blade;

Fig. 3 is a section on the line 3—3 of Figs. 1 and 2;

Fig. 4 is a detail view of a blade stirrup;

Fig. 5 is a detail blade section illustrating that the pitched airfoil section extends close to the hub;

Fig. 7 is a section on the line 7—7 of Fig. 6 showing the gear train mechanism.

Figure 6:
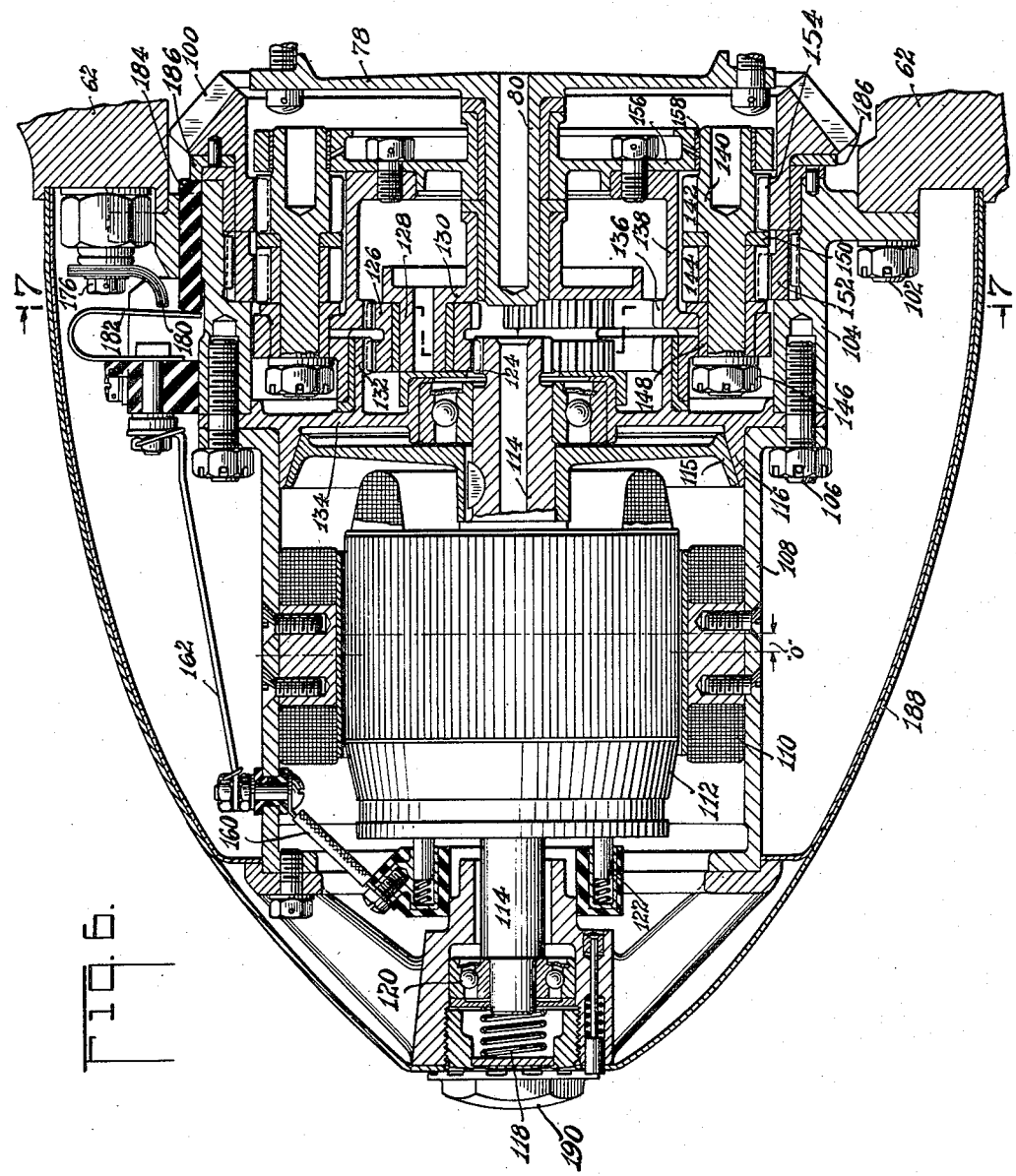
Fig. 6 is an axial view through a motor and reduction gear mechanism on slightly larger scale than Fig. 1.

Referring first to Fig. 1, 10 designates a conventional engine power shaft on which there is mounted a propeller hub 12 by means of the usual splines 14, cones 16—18, and a propeller hub nut 20. Integral with the hub there are formed loop or link members 22 seen also in cross section in Fig. 3 and in edgewise view in Fig. 2. These loops comprise arms rigid with the hub against which are seated pivot blocks 24 comprising sockets for large balls 26. The pivot block 24 has an inwardly extending skirt 25 in which lubricant is retained by centrifugal force. Linked through each propeller hub arm 22 is a U shaped blade stirrup member 28 engaging the ball 26 as shown. The stirrup member 28 has widened palms 30 at its outer end and these palms have buttress serrations 32 on their opposed inner faces and fitted thereto are companion serrations on an enlarged parallel sided butt 34, formed integral with each propeller blade 36. The blades are adapted for assembly edgewise, i. e., lengthwise of the serrations, being secured in rigid relationship with the stirrups 28 by bolts 38.

Referring to the detailed section of Fig. 3 wherein the parts are shown midway between their extreme pitch adjustments, it will be seen that the sections of the propeller hub link 22 and of the stirrup 28 are such as to permit angular pitch changing swing A on either side of this position. The proportions shown afford a total pitch change adequate for a full feathering propeller.

A cylindrical inner bumper member 40 surrounds the stirrup 28 to which it is secured by splines 42 and by the bolts 38 which are tapped into extensions 44 of the member 40 as seen in Fig. 2. A large cylindrical rubber bushing 46 is vulcanized to the inner member 40 and to an outer housing 48 which has a flange and bolt connection 50 whereby it is rendered rigid with a companion flange 52 integral with a journal sleeve 54 which is, in turn, integral with a bevel gear quadrant 56. The bevel gear member 52—54—56 is rotatably mounted in a split bushing 58 having end flanges 60. The bushings 58—60 are fitted to bores in a front housing 62 and a rear housing 64 secured together by bolts 66 whereby the bushings 58—60 are rigidly clamped, thus holding the bevel gear member 52—54—56 and the outer bumper member 50—48 rigid against tilting and axial movement but free for rotation with the blade about its pitch changing axis on the ball 26.

A flexible sealing sleeve 68, preferably of rubber, is clamped around the upper end of the inner bumper sleeve 40 and around the bottom portion of the propeller blade 36, to form a dirt tight closure, as shown.

The rear housing 64 is piloted on the hub 12 through an insulating collector ring member 10, later to be described, while the front housing 62 is rigidly secured to a triangular flange 72, integral with the hub 12, by means of bolts 74.

In case the engine is of the type which breathes through a hollow in its power shaft 10, the front member 62 is provided with radial vent passages 76, communicating with the end of the shaft 10, beyond the thrust nut 20, through a cavity formed beneath a cover plate 78, which carries an integral journal stub 80, for gearing shown in Fig. 6 and later to be described.

Disassembly of the blades is effected as follows:

The rubber sealing sleeve 68 is first unclamped from the inner bumper member 40 and removed outwardly of the blade for which purpose the sleeve may conveniently be turned inside out. The bolts 66 and 74 are then unscrewed for removal of the housings 62—64. The bolts 38 clamping the blade root 34 between the serrated stirrup palms 30 are then removed, whereupon the blade may be slid out laterally of the serrations. The bolts 50 are now undone and the bumper assembly 48—46—40 is slid radially off the stirrup 28 which is now loose and may be pushed inwardly sufficient for withdrawal of the socket and pivot ball 26. The stirrup 28 may now be turned over and withdrawn from the propeller hub loop 22 which embraces it, since the opening between the serrated palms 30 is sufficient to pass the arm section 22 as will be clear by comparing Figs. 2 and 3.

It will now be seen that, by means of the novel link and ball construction of this invention, each propeller blade is articulated for universal motion about the center of the ball 26. The ball is free to rotate on the pivot cup 24 for pitch changing movement of the blade which, as the same time, is articulated upon the ball to yield to torque and thrust forces i. e., to lag rotationally and to lean forward until stabilized by centrifugal force and/or the restraint of the rubber bumper 46. As before stated, the outer member 48 of the stabilizing rubber bumper 46 is rigidly located in the housing 62—64 by its rigid securement to the bevel gear 52—54—56 which is limited to pitch changing rotation in the bushing 58 which is, in turn, rigid with the housing.

It will be understood that the radial centrifugal pull developed by propeller blades is of very great magnitude and that, as soon as the blade leans or lags from its normal radial position upon the ball articulation 26, components of the centrifugal force are set up tending to restore the blade to its radial position. The blade, accordingly, reaches a stabilized angle of lag under torque forces, and of forward leaning under thrust forces, whereat these centrifugal components balance the corresponding forces. In the case of the blade lag due to torque, the result is that the axis of the blade becomes tangential to the hub center, a mean degree of tangency being indicated at T, Fig. 2, and the axis of the arms 22 and of the operating bevel gear 56 with the rubber bumper assemblage 46, are preferably conformed to the tangency dimension corresponding to the average operating conditions of the propeller, under which condition there will be zero load on the rubber bumper 46 and zero bending moments on the arms 22 and blade stirrups 28. In other words, centrifugal pull of all the blades acts on the propeller shaft at the offset of T and the blades will automatically align themselves until their axes define a dimension T such that the gross centrifugal force times the arm T is equal to the torque due to the power being transmitted. This dimension is of the order of ½" with current blade weights but will be greater with the lighter blades made possible by the elimination of vibratory and other bending forces according to this invention.

It is pointed out that the centrifugal force of the propeller blade and the aerodynamic thrust and drag, which correspond to the propeller thrust and driving torque, all increase as the square of the speed, in any given pitch setting. Thus, there will be no change in blade attitude i. e., in tangency dimension T when the engine is opened up gradually from minimum power and speed without change in the pitch. Preferably, the dimension T is designed to correspond to the average cruising pitch setting, whereat, accordingly, the propeller blade and the hub arms are subject to centrifugal tension alone and are free of all bending stresses.

However, should the engine throttles be suddenly opened wide at idling speed, the full engine torque might be developed for a few seconds before the propeller accelerates to corresponding speed and it is intended that the rubber bumpers 46 should have sufficient strength to momentarily take the torque bending moments without excessive yield and also, to look after misfiring and other irregular engine operation at low speeds.

It will be seen that by the structure so far described, there is provided a universally articulated propeller blade attachment wherein a single pivot means provides for pitch changing rotation of the blade and for lag of the blade under torque forces and for leaning of the blade forward under thrust forces so that the blade root is relieved of all bending forces whether from vibration, torque or thrust. The blade roots and their attachments are, accordingly, subject in operation to non-vibratory centrifugal force alone whence the strength and stiffness required therein and in all the associated parts is greatly reduced to a corresponding reduction in their weight and bulk, in accordance with a prime objective of the invention.

In conventional propellers which have been stiffened to bring their natural frequency to be above the range of any of the engine exciting forces and with conventional blade mounting means, it has been found necessary to go to circular sections at the blade roots and these large non-pitched sections have a very detrimental effect on the cooling of air cooled engines for which it is desired to carry the airfoil section as close to the hub as possible. This objective is achieved by the novel structure of this invention whereby the chord of the desired pitch section at the blade root is closely aligned to the axis of the rectangular blade butt 34 and the transition from this elongate rectangular section to the adjacent airfoil section is smoothly accomplished as indicated in the fragmentary view of Fig. 5 which is a transverse section taken about half way up the blade.

A master bevel gear 100, Fig. 6, is meshed with each of the bevel gear quadrants 56 in the usual way and any power and gearing means for controlling the master bevel gear may be used in conjunction with the novel structure heretofore described. The preferred mechanism, which has several novel features, will now be described with reference to Fig. 6, in which the forward face of the housing 62, the plate 78 and the journal stub 80, already described, will be recognized on the right hand side. Secured to the housing 62 as by bolts 102 is the housing 104 to which is, in turn, secured as by bolts 106 a field frame 108 of a reversible motor comprising the poles 110 and a conventional armature 112 and armature shaft 114. In this case, however, the armature 112 is offset axially as indicated at O from the center line of the poles 110 and the armature shaft is provided with a cone clutch 115 engaging a fixed clutch member 116 under the influence of a spring 118 through the ball thrust bearing 120, as shown.

The motor is provided with suitable brush gear 122 and the right hand end of the armature shaft 114 has a pinion 124 engaged with double planetary pinions 126 mounted on journal pins 128 in a cage member 130 free to rotate on the stub 80 previously described. A fixed annular gear 132 integral with a cover 134, and a driven annular gear 136 integral with a cage member 138, are meshed with respective ends of the double pinions 126, the annular gears 132—138 having a small differential in their tooth numbers, thus driving the cage member 138 at reduced speed. This cage member carries a large plurality (in this case 14) of pinion shafts 140 having integral pinions 142 and separate pinions 144 frictionally clamped together by means of the nuts 146 and bushings 148 which act as distance spacers, a friction washer 150 being interposed between the pinions. The pinions 144 mesh with a toothed annulus 152 rigidly splined into the housing 104, while the pinions 142 are meshed with internal teeth 154 integral with the bevel gear 100, as shown. The cage member 138 has bearings for the bushings 148 formed integral as shown, whereas a separate member 156 is bolted on at the right hand end to carry bushings 158 for support of the right hand ends of the pinion shafts 140 and this member 156 is journalled upon the stub 80 previously described.

The parts so far described in Fig. 6 comprise a compact reduction gear, comprising a first and a second set of differential planetary gears in series, of which the second or high torque set embodies an extraordinarily large number of pinions suited to the high torque load at this end of the system. Such a large number of pinions 144—142 could not be assembled into the differential tooth rings 152—154 if the paired pinions 144—142 were formed integral as usual unless the differential in tooth number amounted to the number of pinion pairs or a multiple thereof. However, it is contemplated that, in order to achieve the very high gear reduction needed, the differential may be only one tooth wherefore the tooth relationship between the pinions 144—142 of each pair have to be different. This is achieved by tightening up the nuts 146 after assembly.

Current is conveyed to the motor brush assembly 122 through three conductor sets, one of which is seen in Fig. 6, comprising the conductors 160—162. Two such conductor sets comprise the forward and reverse leads for the motor for normal operation while a third is used for feathering. Tracing the connections through to Fig. 1, it will be seen that the insulating member 70 is provided with three concentric slip rings 164—166—168 engaged by brush means 170—172—174 respectively. These are, in turn, connected to suitable electric control means, not forming a part of the invention. The respective slip rings 164—166—168 connect individually to conductor rods 176 which pass through insulating bushings 178 in the bolts 74, one such connection appearing in the top of Fig. 1 and two of these conductor rods (those for the forward and reverse motor control during normal operation) are equipped at their left hand ends with limit switch contacts 180 (refer now to Fig. 6) with which are engageable spring contacts 182 connected with the leads 162 already described and operated by insulating tappets 184 engaging a light ring cam 186 pinned to the master bevel gear 100 to rotate therewith as shown. It will be seen that when the gear 100 reaches the limit of its travel as set by the "timing" of the cams 186, the corresponding tappet 184 is pushed to the left, opening the switch 182—180, as shown, and further automatic pitch change is prevented. The third conductor rod 176 may be connected to the motor permanently without the interposition of any limit switch and is used for manual feathering control only whereby the automatic pitch change limit set by the limit switches 180—182 may be over-ridden. Actually the feathering electrical conductor is in parallel with the pitch-increasing conductor, bridging the limit switch and having its separate circuit closer. After feathering, propeller pitch is reduced by closing the normal pitch reducing circuit, this having been cut out by a master switch during feathering.

The mechanism of Fig. 6 is streamlined and protected from electrical or other derangement by the cover 188 conveniently secured by the nut 190.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a propeller hub having an arm including an aperture, a rotatable sleeve projecting from the hub and embracing the arm, a stirrup having opposed serrated palms spaced to permit said stirrup to be articulately linked through said aperture, a propeller blade rigidly fitted to said serrations, and articulation means between said sleeve and stirrup comprising an elastic annulus between and secured to the stirrup and sleeve whereby the blade is rigidly restrained against centrifugal forces but movable under lateral forces and for pitch changing rotation with the sleeve.

2. In a propeller in combination, a hub having an arm extending rigidly therefrom, a blade member articulately engaging said arm against radial displacement under centrifugal force, a pitch control means embracing each arm and blade member in spaced relation thereto, a housing in which said means is rigidly journalled against other than pitch changing movement and an elastic bushing secured to and between said means and said blade member, said bushing acting as a pitch change transmission agency and as a buffer against blade articulation.

3. A propeller blade attachment including a hub, a pair of radial arms defining a loop, a blade member having companion arms threaded through the hub arms and having angular clearance for pitch changing movement with respect thereto, an inner sleeve rigid with said blade member, an outer sleeve, a rubber bushing between and vulcanized to respective sleeves, means rigid with said outer sleeve for controlling the pitch changing motion of said blade and a bearing rigid with said hub restraining said outer sleeve from tilting.

4. In a propeller in combination, a hub having loops extending rigidly therefrom, a blade, blade mounting means articulately threaded through said loops and fastened to said blade, a housing rigid with said hub and having a journal bearing surrounding each loop, a pitch control member including a rigid outer sleeve journalled in said bearing against tilting, an inner sleeve rigid with and tiltable with said propeller blade and a rubber blade stabilizing bushing vulcanized to and between said sleeves to elastically resist lagging and leaning of said blade under torque and thrust forces and to transmit thereto the pitch control motion of said member.

5. In a propeller in combination, a hub having a link member rigidly extending therefrom, a blade having a member linked through the first said member to comprise a blade articulation rigid against centrifugal force but free for pitch changing rotation and for yield of said blade from the radial position urged by centrifugal force, a housing rigid with said hub and having bearings surrounding said link members, and pitch control and blade stabilizing means journalled in said bearings and including an elastic connection with said blade member.

6. In a propeller, an integral hub member for mounting on a shaft including a substantially radially extending loop element, an open end link assembled through said member, a ball joint between the bends of said element and link, a blade rigidly attached to and between the open ends of said link, a sleeve embracing said link and rigid therewith, a hub housing having an aperture through which said blade projects, and a rubber bushing between said aperture and sleeve and contacting said blade for sealing the housing and stabilizing the blade toward a normal substantially radial position relative to the hub.

7. In a propeller, an integral hub member for mounting on a shaft including a substantially radially extending loop element, an open end link assembled through said member, a ball joint between the bends of said element and link, a blade rigidly attached to and between the open ends of said link, a rubber bushing embracing said link and rotationally drivably connected therewith, and means to drive the bushing to effect changes in blade pitch.

8. In a propeller, an integral hub member for mounting on a shaft including a substantially radially extending loop element, an open end link assembled through said member, a ball joint between the bends of said element and link, a blade rigidly attached to and between the open ends of said link, a rubber bushing embracing said link and rotationally drivably connected therewith, means to drive the bushing to effect change in blade pitch, a hub housing embracing the hub, and pitch changing means sealed relative to the bushings and blade link.

9. In a controllable pitch propeller, an integral hub unit having a central opening to receive an engine power shaft and having integral substantially radial extensions, one for each blade, each extension having an eye formed therein, the outer end of the eye having a ball seat facing inwardly, a ball in each seat, blade carriers each comprising integral U elements threaded through said eyes and having ball sockets in the recess of the U for bearing engagement with respective said balls, the limbs of said U's comprising flat serrated palms, propeller blades having flat serrated butts in pitch disposition engaged by said palms and secured thereto; splines on the outer faces of the limbs of each U element, a cylindrical sleeve internally splined to engage the U element splines, a second sleeve embracing the first, resilient means between said sleeves and secured thereto for sealing the assembly and affording a driving connection, a housing embracing said hub unit having apertures through which said hub extensions and U elements project, bearing means, in which said outer sleeves are journalled, rigidly carried in the housing at said apertures; gears on said outer sleeves at their ends closest to the hub, a gear concentric with the hub engaging said sleeve gears, and power means connected to said concentric gear for turning same and for effecting blade pitch changes in unison.

ROLAND CHILTON.